Nov. 10, 1964  R. F. DOERING ETAL  3,156,532
YTTRIUM-90 GENERATOR
Filed June 30, 1961

INVENTORS
ROBERT F. DOERING
WALTER D. TUCKER
BY Roland A. Anderson
Attorney

3,156,532
YTTRIUM-90 GENERATOR

Robert F. Doering, Smithtown, and Walter D. Tucker, Sayville, N.Y., assignors to the United States of America as represented by the United States Atomic Energy Commission
Filed June 30, 1961, Ser. No. 121,264
1 Claim. (Cl. 23—252)

This invention relates to an apparatus for isolating radioisotopes and more particularly to an apparatus for isolating carrier-free yttrium-90, a short-lived beta ray emitter.

Yttrium-90 is a pure beta-emitting isotope (64 hour half-life) that has found considerable application in medicine. It has been used to control effusions in the pleural and peritoneal cavities as the result of malignancies in the cavities, to "mop up" after abdominal cancer surgery by destroying any malignant cells spread around as a result of spillage, and in the treatment of leukemia and polycythemia vera.

To date, there is no satisfactory source of yttrium-90. The medical profession, in order to obtain this isotope, must obtain it by the irradiation of extremely pure yttrium oxide. Another method, which has been disclosed on page 22 of BNL–472, Progress Report, Nuclear Engineering Department of Brookhaven National Laboratory, available from the Office of Technical Services, Department of Commerce, Washington 25, D.C., is the method of milking yttrium-90 from its parent strontium-90, relying upon the decay of the strontium-90 as represented by the equation:

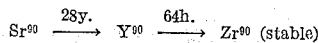

However, the use of $Sr^{90}$ as a milking source is unattractive because of a combination of its properties, i.e., long half-life, tendency to concentrate in bone and beta emission. Two (2) microcuries of strontium-90 fixed in bone is the current permissible lifetime maximum dose for an individual. Thus, it can be seen that any milking apparatus for milking strontium-90 would ordinarily require a highly skilled technician with great knowledge in operating or performing work around radioactive material.

Therefore, an object of this invention is to provide an apparatus for use in the process of milking yttrium-90 from strontium-90.

Another object of this invention is an apparatus which can be used to milk $Y^{90}$ from $Sr^{90}$ without milking toxic levels of $Sr^{90}$ therewith.

A further object of this invention is an apparatus which can be handled simply and without endangering the life or health of an unskilled technician.

Figure 1:
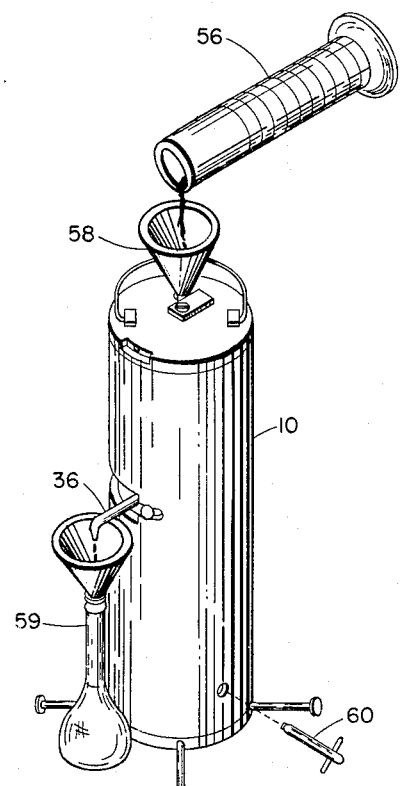
Figure 2:
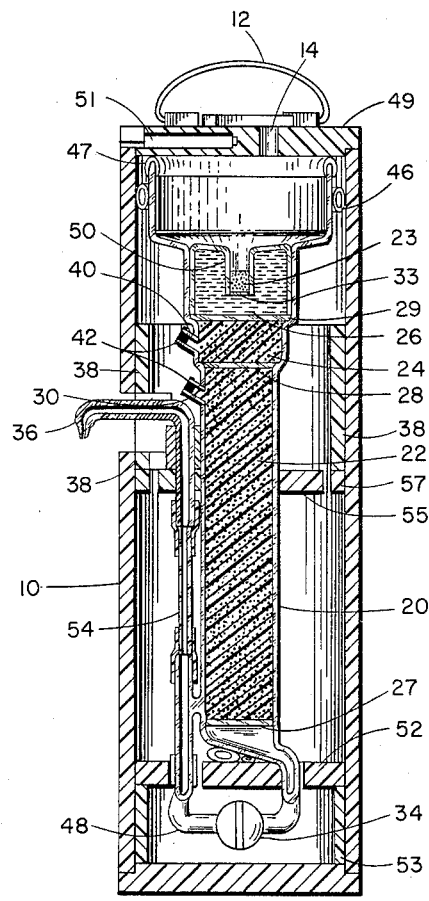
Figure 3:
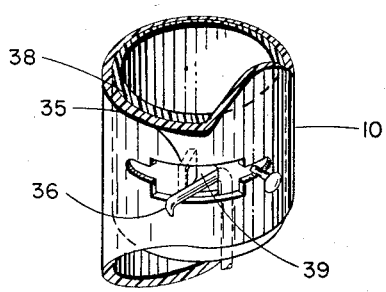

Other objects of the present invention will be more readily apparent by reference to the following detailed description when taken in connection with the accompanying drawings, in which:

FIG. 1 is an isometric view of the apparatus;
FIG. 2 is a section view of the interior of the apparatus; and
FIG. 3 is a detail view of the product delivery tube of the $Y^{90}$ generator.

It has been found that the apparatus described herein provides a simple, rapid and safe means of effecting the separation of $Y^{90}$ from $Sr^{90}$. It can retain strontium-90 without emitting radiation to the surrounding atmosphere by keeping it completely shielded and upon operation will separate yttrium-90 from strontium-90 without carrying over harmful levels of strontium-90.

Referring to FIGS. 1 and 2, container 10, which can be of Lucite material or any other material which can be used as beta ray shielding, contains a glass chamber 20 which is separated into regions 22, 24 and 26 by porous glass discs 27, 28 and 29. A cation exchange resin is contained in regions 22 and 24, whereas region 26 contains an eluting fluid. Glass cylinder 20 contains two side arm portals 30 and 40 which contain rubber stoppers 42.

The resin used is one of a group of strongly acidic cation exchange resins made by sulfonation of a polystyrene-divinylbenzene copolymer, Dowex 50–X–8, is a resin of the type used. Other commercial resins of the same base, which can be used in the apparatus, are Amberlite IR–120, Nalcite-HCR and Permutit Q.

A stopcock 34 and a product delivery tube 36 are also members of the apparatus. A handle 12 is provided for transportation purposes and a door means 38 for keeping the product delivery tube enclosed within container 10 until the generator is ready for operation.

An inverted glass sleeve 50 is fused securely into glass container 20. An alumina particle bed 23 is maintained in said sleeve 50 by a porous glass disc 33. A rubber shock absorber 46 encircles the glass cylinder 20 and separates it from the Lucite container 10, and another rubber shock absorber 47, fits snugly between the top of glass cylinder 10 and the cover 49 of container 10, thus preventing any movement of the glass cylinder 20.

Lucite platform 53 supports a circular plastic disc 52 which also assists in holding glass container 20 from moving when sliding door 38 is rotated to swing delivery tube 36 to the exterior. Lucite clamp 55 secures the product delivery tube 36 in an upright position but allows it free rotary movement. Platform 57 allows rotatable circular Lucite door 38 to rest upon it. This platform can be affixed to the Lucite container 10 by means of screws or adhesive material.

Cover 49 contains both a storage area 51 where a stopcock extension handle 60 may be placed when the apparatus is not in use and an eluting solution port 14.

The glass product delivery tube 36 is attached to outlet 48 by means of a Tygon (or similar soft plastic tubing) swivel 54, which allows for rotation of the delivery tube 36. A graduated cylinder 56 and funnel 58 is illustrated in FIG. 1. They are used to measure and pour fluid into the apparatus. A funnel and product receiver 59 are illustrated, but it is within the contemplation of the inventors that any receiver which can retain yttrium-90 can be substituted.

The operation of the apparatus is simple and safe for the most inexperienced technician. The yttrium-90 generator is prepared for operation by skilled technicians in the following manner. The cation exchange resin is poured into regions 22 and 24 of glass cylinder 20 through portals 30 and 40 respectively. After the resin has been loaded in the generator, the rubber stoppers 42 are fitted in place and region 26 is filled with citric acid solution in the manner set forth below. The $Sr^{90}$ solution is poured through the eluting solution port 14. The $Sr^{90}$ is removed from solution by the resin. It has been found that it is concentrated in the top 1/4" or so of region 24.

The strontium-90 solution used is a dilution of 1 millicurie of $Sr^{90}$ per milliliter of solution. The $Sr^{90}$ is fixed only on the resin in region 24. It is thus prevented from mixing with the bulk of the resin in the lower part of the column as the result of shock or vibration during shipping or handling. Prior to establishing the alumina bed 23, and prior to fixing the strontium-90 upon the resin material in region 24, a .5% citric acid solution with a pH of about 5.50, adjusted by adding ammonium hydroxide, is introduced into the glass cylinder 20 until region 26 is filled with the citric acid. This will prevent air from entering the apparatus and affecting the resinous material, as it prevents it from drying out and losing its ion exchange properties.

The apparatus is then shipped to the laboratory or hospital where it is to be put in use. The yttrium-90 formed by decay of strontium-90 is removed from the generator in the following manner. A .5% citric acid solution with a pH of about 5.50 is passed from graduate cylinder 56 through eluting solution port 14 to the inverted sleeve 50 in the glass cylinder 20. The eluting acid is funnelled through the alumina particle bed 23, then through the porous glass disc 29.

It has been found that the eluting acid will cease flowing when the level of the acid drops to about the surface level of the alumina particle bed 23. This enables the technician to leave the generator unattended and be assured that the flow of the eluting acid will stop automatically.

As the acid drains through region 24, the $Y^{90}$ that has grown in this region is complexed by the citrate ion and is stripped from the resin. The $Sr^{90}$ is unaffected and remains behind. The acid then passes through region 22 where any strontium-90 which may possibly be carried over due to radiation damage to the cation exchange resin in region 24 is deposited upon the cation exchange resin contained in this region, thus delivering a substantially strontium-free solution.

The acid passes through region 22 and through outlet 48. Stopcock 34 is an adjustable Teflon stopcock which can be adjusted before shipping to the consumer to allow the eluting fluid to flow through at a rate of from 3 to 4 ml. per min. The acid containing the yttrium-90 is delivered to a receiver through product delivery tube 36.

The container 10 completely encloses the glass cylinder 20 and the product delivery tube 36 when the generator is not in operation and during shipment.

FIG. 3 illustrates how the product delivery tube is made ready for use. As stated above, during shipping and when the apparatus is not in use, the product delivery tube remains within container 10. The apparatus is thereby completely shielded. When the apparatus is needed for use, the product delivery tube is the only portion exposed. This is done by a sliding door 38, which on opening, moves the product delivery tube 36 out of the cylinder 10 as tab 35 on door 38 contacts the edge of tube 36 and moves it to the exterior through portal 39.

The radiation level of this apparatus is approximately 50 mr./hr. at contact and 1 mr./hr. at a distance of 3 feet from it when 100 mc. of equilibrium $Sr^{90}$–$Y^{90}$ are on the column. Therefore, it is safe to place 100 mc. of strontium-90 in region 24. It should also be noted that the generator is ready for use as soon as it is received.

Using this apparatus a yield of 98% of $Y^{90}$ present at the time of milking is obtained. The $Sr^{90}$ contamination in the product solution is less than 0.001 $\mu$c. per 100 ml. of product solution. The $Y^{90}$ as it comes from the generator is carrier-free. There is an excess of citrate ion associated with it. For some physiological applications it may not be desirable to have the yttrium in the form of a citrate complex. However, this complex can easily be broken in any one of several ways. Yttrium hydroxide may be precipitated by a strong NaOH solution, after the addition of yttrium carrier, or the $Y^{90}$ may be obtained carrier-free by co-precipitating it with ferric hydroxide. Alternatively, the citrate ion may be destroyed by taking the product solution nearly to dryness after addition of 30% hydrogen peroxide or of a mixture of nitric and sulfuric acids.

To check on the $Sr^{90}$ contamination level as well as to guard against a gross contamination of the product solution as the result of an accident or maloperation of the generator, an assay method disclosed by R. F. Doering et al. in Journal of Inorganic and Nuclear Chemistry, 15, 215–221, October 1960, was found to be satisfactory. It will detect as little as 0.02 $\mu$c. of $Sr^{90}$ in the presence of 100 mc. of $Y^{90}$. It takes about 1 hour to perform and uses a small aliquot of the product solution, so that each milking may be tested before administration. In this way there can be confidence on the part of the laboratory personnel in the purity of the $Y^{90}$ being handled and a protection against both the real and the psychological hazards of working with $Sr^{90}$. While the method will not detect the extremely low levels of $Sr^{90}$ normally present, it will detect an increase in this level by a factor of about 20. This is still well below the point where any hazard would exist.

Since many embodiments might be made of the present invention and since many changes might be made in the embodiment described, it is to be understood that the foregoing description is to be interpreted as illustrative only and not in a limiting sense.

We claim:

Apparatus for separating yttrium-90 from its parent strontium-90 consisting of:
(1) a vertical column;
(2) beta shielding means surrounding the vertical column;
(3) porous partitions separating said column into three vertically spaced zones, said zones consisting of:
  (a) an upper zone containing an eluting solution;
  (b) a middle zone containing strontium-90 fixed to an ion exchange resin, and
  (c) a lower zone containing an ion exchange resin;
(4) a porous bed and a porous support therefor closing the upper zone;
(5) an inlet for introducing eluting material through the porous bed into the upper zone; and
(6) an outlet for removing strontium-90 free yttrium-90 from the lower zone consisting of a delivery tube, a flexible tube secured to the delivery tube, a slide means engaging the delivery tube and flexing the flexible tube whereby the delivery tube is movable between an operative position and a retracted position within the shielding means and a valve intermediate the lower zone and the delivery tube, said outlet being within the shielding means and above the lower end of the column.

References Cited in the file of this patent

UNITED STATES PATENTS

| | | |
|---|---|---|
| 1,978,447 | Austerweil et al. | Oct. 30, 1934 |
| 2,038,349 | Diesbourg | Apr. 21, 1936 |
| 2,692,855 | Juda | Oct. 26, 1954 |

OTHER REFERENCES

Coryell and Sugarman: Radio Chemical Studies, Book I, The Fission Products Nuclear Energy Series, McGraw-Hill Book Co., 1951, pp. 310–317.